United States Patent Office 3,804,851
Patented Apr. 16, 1974

3,804,851
DERIVATIVES OF 2-CYCLOALKYL-1-PHENYL-3,4-DIHYDRONAPHTHALENES
Daniel Lednicer, Kalamazoo, Mich., assignor to The Upjohn Company, Kalamazoo, Mich.
No Drawing. Original application Jan. 2, 1968, Ser. No. 694,811, now Patent No. 3,567,737. Divided and this application Nov. 5, 1970, Ser. No. 87,326
Int. Cl. C07c 43/20; C07d 27/04
U.S. Cl. 260—326.5 M                3 Claims

ABSTRACT OF THE DISCLOSURE

Derivatives of 2 - cycloalkyl - 1-phenyl-3,4-dihydronaphthalenes and processes for the preparation of the same. The novel compounds have utility as anti-fertility, estrogenic, anti-estrogenic, anti-spermatogenic cholesterol lowering and lipid normalizing agents.

CROSS-REFRENCES TO RELATED APPLICATIONS

This is a division of application Ser. No. 694,811, filed Jan. 2, 1968, now issued as U.S. Pat. No. 3,567,737.

BRIEF SUMMARY OF THE INVENTION

This invention relates to novel derivatives of 2-cycloalkyl-1-phenyl-1,2-dihydronaphthalene (I, below), processes for preparing the same, and novel intermediates prepared by said processes.

The novel compounds of this invention have the formula:

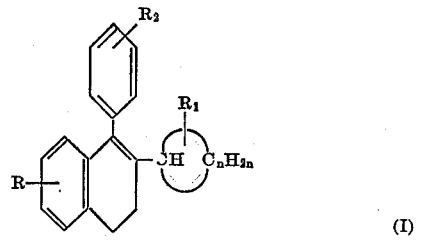

(I)

wherein R represents alkoxy and cycloalkoxy; $R_1$ is selected from the class consisting of hydrogen and lower alkyl; and $R_2$ is selected from the class consisting of hydrogen, alkyl, hydroxy, halogen, alkoxy, alkoxy substituted by a group selected from the class consisting of (a) dihydroxyalkyl, having from 2 to 5 carbon atoms, inclusive, (b) a group having the structure

wherein $R_3$ and $R_4$ individually are similar or different alkyl groups and when taken together with the attached nitrogen atom form the residue of a saturated heterocyclic amine containing from 5 to 7 ring members, inclusive, and (c) the radical —$C_mH_{2m}$—$R_5$ wherein $m$ is an integer from 1 to 6, inclusive, and $R_5$ is selected from the group consisting of carboxy and lower carbalkoxy, and $n$ is 4 or 5.

The term "alkyl" means an alkyl radical of from 1 to 4 carbon atoms, inclusive, such as methyl, ethyl, propyl, and butyl, and isomeric forms thereof. The term "halogen" means fluorine, chlorine, bromine and iodine. The term "alkoxy" means alkoxy containing from 1 to 4 carbon atoms, inclusive, such as methoxy, ethoxy, propoxy, and butoxy, and isomeric forms thereof. The term "cycloalkoxy" means cycloalkoxy containing from 3 to 6 carbon atoms, inclusive, such as cyclopropyl, cyclobutyl and the like. The term "dihydroxyalkyl from 2 to 5 carbon atoms," is inclusive of 1,2-dihydroxyethyl, 1,3-dihydroxypropyl, 2,3-dihydroxypropyl, 1,4-dihydroxybutyl, 1,3-di-hydroxybutyl, and the like. The term "saturated heterocyclic amine containing from 5 to 7 ring atoms" is inclusive of pyrrolidino-, alkylpyrrolidino such as 2-methylpyrrolidino-, 2,2 - dimethylpyrrolidino-, 3-methylpyrrolidino and the liwe; piperazino, alkylpiperazino such as 2-methylpiperazino, 4-methylpiperazino-, 2,4-dimethylpiperidino and the like; piperazino, alkylpiperazino such as 2-methylpiperidino, 3-methylpiperidino, 4,4-dimethylpiperidino, and the like; morpholino, hexamethylenimino, homopiperazino, and the like. The term "carbalkoxy" means the group —COOAlkyl wherein Alkyl is alkyl as hereinbefore defined.

The term "novel compounds of this invention" as used throughout the specification embraces the compounds represented by the Formula 1 above, including the acid addition salts and quaternary ammonium salts of said compounds wherein the substituent $R_2$ contains a tertiary amino group, and the alkali-metal and alkaline earth metal salts of the compounds of Formula I wherein the substituent $R_2$ represents hydroxy.

The novel processes for making the novel compounds wherein $R_2$ is alkoxy or substituted alkoxy is illustrated in the following equations.

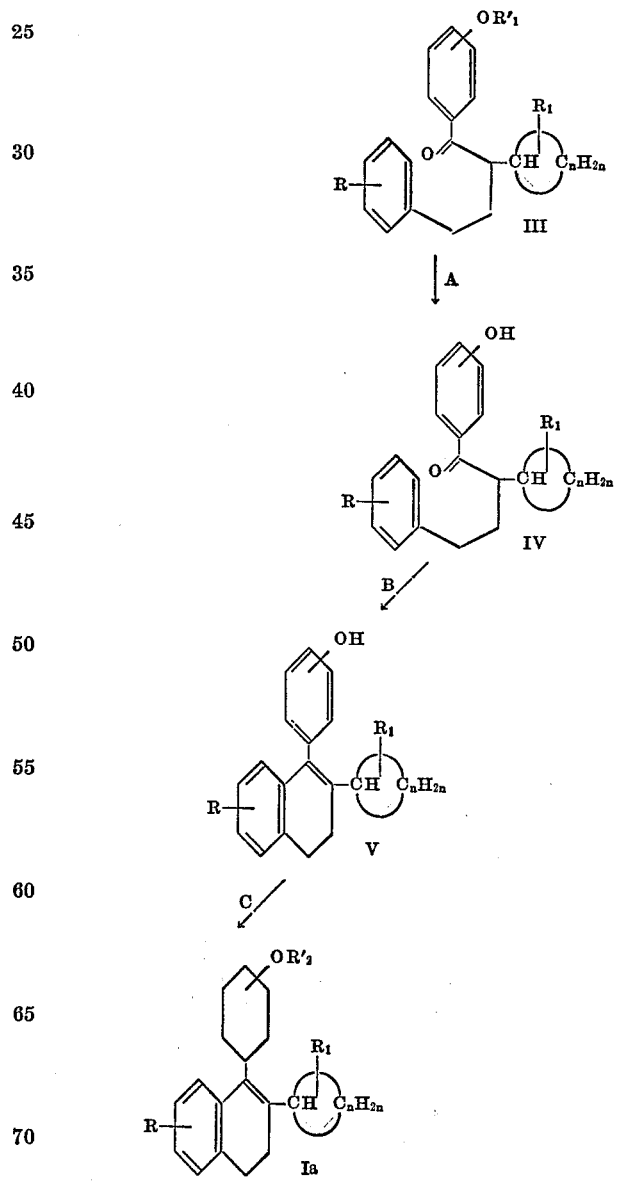

wherein R and $R_1$ are the same as above; $R'_1$ is alkyl, $R'_2$ is alkyl, having from 1 to 4 carbon atoms, inclusive, alkyl substituted by a group selected from the class consisting of (a) dihydroxy alkyl having from 2 to 5 carbon atoms, inclusive, (b) a group having the structure

wherein $R_3$ and $R_4$ individually are similar or different alkyl groups and when taken together with the attached nitrogen atom form the residue of a saturated heterocyclic amine containing from 5 to 7 ring members, inclusive, and (c) the radical —$C_mH_{2m}$—$R_5$ wherein $m$ is an integer from 1 to 6, inclusive, and $R_5$ is selected from the group consisting of carboxy and lower-carbalkoxy; and $n$ is 4 or 5.

The novel process for making the compound of Formula I, wherein R is other than substituted alkoxy is illustrated in the following equations.

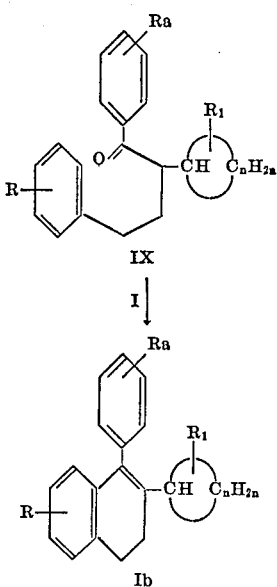

wherein $n$, R and $R_1$ are the same as above, and Ra is selected from the group consisting of hydrogen, alkyl, hydroxy or halogen.

DETAILED DESCRIPTION

The starting phenyl substituted 1-butanone Formulae III and IX can be prepared by (a) formylating the appropriate phenyl cycloalkylmethyl ketone (b) subjecting the product of the formylation to a modified Wittig reaction to form an unsaturated ketone and (c) catalytically reducing the unsaturated ketone. These steps are illustrated in the following equations:

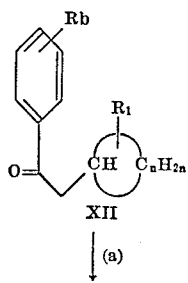

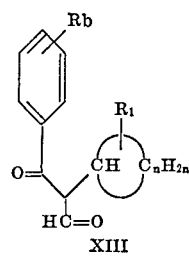

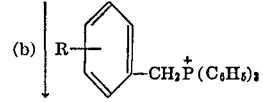

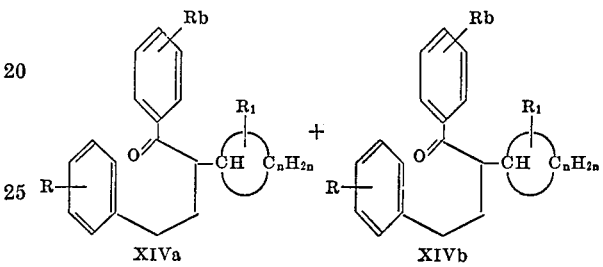

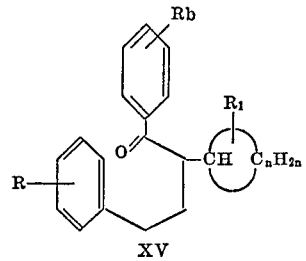

wherein $n$, R and $R_1$ are the same as above, and Rb is selected from the group consisting of hydrogen, alkyl, alkoxy and halogen.

The formylation step (a) is accomplished by treating the ketone (XII) with ethyl formate in the presence of a metal alkoxide. The ketone (XII) utilized in the formylation reaction can be prepared by standard procedures for readily conducted at 25° C.; however, higher or lower temperatures may be used if desired. Step (b) represents a modified Wittig reaction. In the basic Wittig reaction, the usual procedure involves reacting an ylide with an aldehyde. However, it has been found that high concentrations of the ylide $(C_6H_5)_3P{=}CHAr$, adversely affect the preparing 2-substituted-acetophenones. The reaction is reaction. For this reason, instead of using the ylide, the solid triphenylphosphonium salt is added to a mixture of the anion of the keto-aldehyde. Here again, a wide range of temperatures may be used, but it is preferably conducted under reflux conditions. Also, this reaction is preferably conducted in the presence of a solvent, i.e., tetrahydrofuran. The final step (c) involves the catalytic reduction of the mixture of isomeric olefins (XIVa and XIVb) formed in step (b). It is performed by contacting the isomeric mixture with hydrogen in the presence of a noble metal catalyst. For example, hydrogen may be bubbled thru a warm solution of the isomeric olefins in the presence of a palladium catalyst.

The cis isomers of the compound of Formula II, wherein $R_2$ is a substituted alkoxy group, are prepared in accordance with reaction scheme A, B, D, and E set forth in the flow sheet above.

In step A, the alkylated ketone of Formula III is dealkylated to yield the hydroxy ketone of Formula IV. This preferential dealkylation is accomplished by heating the alkylated ketone with three equivalents of aluminum chloride in benzene. The amount of aluminum chloride used is critical. It has been found that when less than three equivalents are used, the reaction does not proceed. Also, prolonged heating during this step should be avoided, because it results in a reduced yield. It is preferred to conduct the reaction under reflux conditions, although higher or lower temperatures may be used if desired.

In step B, the hydroxy ketone of Formula IV is cyclized to yield the hydroxy dihydronaphthalenes of Formula V. This ring closure is effected in a solution consisting of a Lewis acid and a solvent such as benzene or toluene. The term "Lewis acid" is well known in the art and is defined succinctly by Fieser and Fieser "Organic Chemistry" Third Edition, page 138 (Reinhold, 1956). Examples of such compounds are hydrogen fluoride, boron trifluoride, arsenic trifluoride, phosphorus pentafluoride, toluene-sulfonic acid, titanium tetrafluoride, concentrated sulfuric acid, polyphosphoric acid and the like. Toluene sulfonic acid is the preferred acid because of the mildness of the reaction when it is used.

Step C involves a phenol alkylation, and it is performed by methods well known in the art for the etherification of phenols. Illustratively, the compounds of Formula Ia wherein $R'_2$ is lower alkyl can be prepared by treating the compounds of Formula V with the appropriate lower alkyl halide in the presence of a base such as sodium hydroxide, sodium methoxide and the like. The etherification is conducted advantageously in the presence of an organic solvent such as tetrahydrofuran, dioxane, or a lower alkanol, for example, methanol, ethanol, and isopropyl alcohol.

The process for the preparation of dihydronaphthalenes of Formula I wherein $R_2$ is other than substituted alkoxy (Ib) is illustrated in reaction I in the flow sheet above.

The acid addition salts of the invention comprise the salts of the basic compounds of Formula I above with pharmacologically acceptable acids such as sulfuric, hydrochloric, nitric, phosphoric, lactic, benzoic, methanesulfonic p-toluenesulfonic, salicylic, acetic, propionic, maleic, malic, tartaric, citric, cyclohexanesulfamic, succinic, nicotinic, ascorbic acids, and the like.

The quaternary ammonium salts of the invention are the salts obtained by reacting the tertiary amino compounds of Formula I with quaternating agents, for example, alkyl halides, alkenyl halides, dialkyl sulfates, aralkyl halides, alkyl arylsulfonates, and the like. The term "alkyl" has the meaning hereinbefore defined. The term "alkenyl" means alkenyl from 3 to 8 carbon atoms, inclusive, such as allyl, 2-butenyl, 2-pentenyl, 2-hexenyl, 2-heptenyl, 2-octenyl, and isomeric forms thereof. The term "aralkyl" means an aralkyl group containing from 7 to 13 carbon atoms, inclusive, such as benzyl, α-phenethyl, α-phenylpropyl, benzhydryl and the like. The term "alkyl arylsulfonates" means the esters formed from alkyl alcohols and arylsulfonic acids such as benzenesulfonic, toluenesulfonic, xylenesulfonic, and the like acids. Examples of quaternary salts of the compounds of the invention are the methobromide, methiodide, ethobromide, propyl ch'oride, butyl bromide, octyl bromide, methyl methosulfate, ethyl ethosulfate, allyl chloride, allyl bromide, benzyl bromide, benzhydryl chloride, methyl toluenesulfonate, ethyl toluenesulfonate and the like.

The novel compounds of the invention as defined above possess pharmacological activity in animals. Thus, the novel compounds of the invention are active as anti-fertility, estrogenic, anti-estrogenic and lipid normalizing agents. Illustratively, the 2-cyclopentyl-6-methoxy-1-[p-(2,N-pyrrilidinoethoxy)phenyl] - 3 - dihydronaphthalene hydrochloride exhibits oral anti-fertility activity in rats when tested by the method described by Duncan et al., Proc. Soc. Exp. Biol. Med. 112, 439–442, 1963.

The novel compounds of the invention are valuable for animal pest control. For example, the compounds of the invention are formulated in combination with baits and/or attractants and placed in feeding stations accessible to undesirable rodents and other small animals including Canedae such as coyotes, foxes, wolves, jackals, and wild dogs and birds such as starlings, gulls, red-wing blackbirds, pigeons, and the like, thus reducing hazards to aviation by their presence on runways and in the vicinity of airfields, the spread of disease and destruction to property in both rural and urban areas .

For purposes of administration to birds and to mammals, including animals of economic value such as horses, cattle, sheep, pigs, mice, rats, rabbits and the like, the novel compounds of the invention can be combined with solid or liquid pharmaceutical carriers and formulated in the form of tablets, powder packets, capsules, and like solid dosage forms, using starch and like excipients, or dissolved or suspended in suitable solvents or vehicles, for oral or parenteral administration.

The following examples are set forth to illustrate my invention and to enable persons skilled in the art to better understand and practice the invention and are not intended to limit the same.

Example 1.—2-cyclopentyl-1-(p-hydroxyphenyl)-4-(m-methoxyphenyl)-1-butanone (A) 2-cyclopentyl-p-methoxyacetophenone: Solid aluminum chloride (53.2 g.) was added to an ice cooled mechanically stirred solution of 21.6 g. of anisole in 100 ml. of carbon disulfide. Over a period of 1 hour there was then added 29.2 g. of cyclopentylacetyl chloride. The resulting heavy paste was stirred for 3½ hours at room temperature and then poured onto a mixture of 200 ml. each of ice and concentrated hydrochloric acid. A small amount of ether was added and organic layer separated. The aqueous portion was extracted with two further portions of ether. The organic layers were combined and allowed to evaporate in the hood overnight. The residue was dissolved in ether and washed in turn with water, 5% aqueous sodium hydoxide, water and a saturated solution of sodium chloride. The oil which remained when the solvent was removed was distilled at 2 mm. $H_2$ to give 39.60 g. of 2-cyclopentyl-p-methoxyacetophenone, B.P. 157–158° C., M.P. 30–31° C.

(B) m-Methoxybenzyltriphenylphosphonium chloride: A mixture composed of 44.16 g. of m-methoxybenzyl chloride and 74.0 g. of triphenylphosphine was heated in an oil bath at 100° C. for 1 hour. The resulting solid cake was broken up and recrystallized from a methylene chloride:acetonitrile solution. There was obtained 86.1 g. of m-methoxybenzyltriphenylphosphonium chloride, M.P. 271–272° C. The mother liquors were concentrated and allowed to cool. An additional 21.6 g. of product, M.P. 271–272° C. was obtained. (Total yield=91%).

Analysis.—Calcd. for $C_{26}H_{14}ClOP$ (percent): C, 74.15; H, 5.77; Cl, 8.47. Found (percent): C, 74.56; H, 6.01; Cl, 8.56.

Similarly, the para- and ortho-methoxybenzyltriphenylphosphonium chlorides are obtained by reacting the appropriate methoxybenzyl chloride with triphenylphosphine.

(C) 2 - cyclopentyl - 3-(p-methoxyphenyl)-3-ketopropionaldehyde: To an ice-cooled solution of 1.15 g. of sodium in 15 ml. of ethanol there was added 4.1 ml. of ethyl formate. The mixture was stirred until homogeneous and allowed to stand in the cold for 2 hours. Then 10.9 g. of solid 2 - cyclopentyl-p-methoxy-acetophenone (step A) was added and the mixture stirred for 20 minutes in the cold and overnight at 25° C. The resulting syrup was poured into 250 ml. of ice water and extracted with ether. Evaporation of the organic layer afforded 8.76 g. of recovered starting ketone. The aqueous layer was then cautiously acidified in the cold and extracted with ether. The extract was washed with water and a saturated solution of sodium chloride and taken to dryness. The residual solid was recrystallized from a mixture of ether and Skellysolve B hexanes to give 1.30 g. of product, M.P. 116–120° C.

The corresponding ortho- and meta-methoxy isomers are obtained by employing the appropriate ortho- and meta-methoxy ketones in place of 2-cyclopentyl-p-methoxyacetophenone in the procedure of step C.

(D) 2 - cyclopentyl - 4 - (m-methoxyphenyl)-2-(p-methoxyphenyl) - 1 - butanone: A solution of 4.93 g. of 2 - cyclopentyl - 3 - (p - methoxyphenyl)-3-ketopropionaldehyde (step C) in 200 ml. of tetrahydrofuran was treated with 0.86 g. of sodium hydride (56% in mineral oil). Following 20 minutes stirring at room temperature, 8.40 g. of m - methoxybenzyltriphenylphosphonium chloride was added, and the mixture stirred for 2 hours at room temperature (25° C.) and 2 hours at reflux. The reaction was then cooled in ice and treated with ether and water. The organic layer was washed with water and a sautrated solution of sodium chloride and taken to dryness. The partly solid residue was chromatographed on 1 l. of magnesium silicate (Florisil) (elution with 10% acetone in Skellysolve B hexanes). The oily fractions which were similar by thin layer chromatography were combined to give 4.19 g. of a mixture of isomeric 2-cyclopentyl - 4 - (m - methoxyphenyl)-1-(p-methoxyphenyl)-1-butenones.

A mixture of the butenones and 0.40 g. of 10% palladium on charcoal in 200 ml. of ethanol was shaken under a hydrogen atmosphere. The theoretical amount of gas was taken up in 5 minutes. The catalyst was removed by filtration. The gum which remained when the filtrate was taken to dryness was chromatographed on 400 ml. of Florisil. The gummy fractions which had similar compositions, as shown by thin layer chromatography, were combined to give 3.75 g. of 2-cyclopentyl-4-(m-methoxyphenyl) - 1 - (p - methoxyphenyl)-1-butanone, NMR: AB pattern at 7.4; 1 $OCH_3$ at 3.85, 0 $OCH_3$ at 3.70, ratio of aromatic to aliphatic protons: Calcd.: 1:2.5, found 1:2.6.

Similarly, other 2 - cycloalkyl - 1,4 - diphenyl-1-butanones are obtained by reacting the appropriate 2-cycloalkyl - 3 - phenyl - 3 - ketopropionaldehyde with the appropriate triphenylphosphonium chlorides using the procedure described in step D.

(E) 2 - cyclopentyl - 1 - (p - hydroxyphenyl)-4-(m-methoxyphenyl) - 1 - butanone: A mixture of 3.75 g. of 2 - cyclopentyl - 4 - (m - methoxyphenyl)-1-(m-methoxyphenyl)-1-butanone (step D) and 4.25 g. of aluminum chloride in 100 ml. of benzene was heated at reflux for 4 hours. The mixture was allowed to cool, and 50 ml. of 2.5 N, hydrochloric acid was added. The organic layer was separated, washed once with water, and extracted with six portions of 50 ml. each of N sodium hydroxide. The gum which precipitated when the alkaline extracts were acidified was taken up in ether. This last solution was taken to dryness and the residue chromatographed on Florisil. The gummy fractions were combined on the basis of thin layer chromatography to give 2.53 g. of 2-cyclopentyl - 1 - (p - hdroxyphenyl - 4 - (m-methoxyphenyl)-1-butanone; NMR: 1 exchangeable proton, 1 $OCH_3$.

Similarly, other derivatives of 1 - (p - hydroxyphenyl)-2 - cyclopentyl - 4 - phenyl - 1 - butanone are obtained by dealkylating the appropriate 2 - cyclopentyl - 1 - (p-methoxyphenyl - 4 - phenyl - 1 - butanones using the procedure described in step E.

Example 2.—2-cyclopentyl-1-(p-hydroxyphenyl)-6-methoxy-3,4-dihydronaphthalene

A solution of 2.53 g. of 2-cyclopentyl-1-(p-hydroxyphenyl)-4-(m-methoxyphenyl)-1-butanone and 2.50 g. of toluene sulfonic acid in 100 ml. of benzene was heated at reflux for 4 hours. The solution was allowed to cool, diluted with ether, washed in turn with aqueous sodium bicarbonate, water and a saturated solution of sodium chloride. The gum which remained when the solution was taken to dryness was chromatographed on 250 ml. of silica gel (elution with meythlene chloride). The crystalline fractions were combined and recrystallized twice from Skelly-solve B hexanes to yield 0.85 of crystalline 2-cyclopentyl-1-(p-hydroxyphenyl)-6 - methoxy - 3,4 - dihydronaphthalene, M.P. 88–90° C.

*Analysis.*—Calcd. for $C_{22}H_{24}O_2$ (percent): C, 82.46; H, 7.55. Found (percent): C, 82.72; H, 8.48.

Other 2 - cycloalkyl - 1 - (hydroxyphenyl)-3,4-dihydronaphthalene derivatives are obtained by replacing 2-cyclopentyl - 1 - (p-hydroxyphenyl)-4-(m-methoxyphenyl)-1-butanone with the appropriately substituted 2-cycloalkyl-1-(hydroxyphenyl)-4-phenyl-1-butanone in the procedure of Example 2. Representative of the dihydronaphthalenes so prepared are 2-cyclopentyl-6-ethoxy-1-(p-hydroxyphenyl)-,
2-cyclopentyl-6-ethoxy-1-(o-hydroxyphenyl)-,
2-cyclohexyl-1-(p-hydroxyphenyl)-6-methoxy-,
2-cyclohexyl-6-ethoxy-1-(p-hydroxyphenyl)-,
cyclohexyl-6-ethoxy-1-(o-hydroxyphenyl)-,
2-cyclopentyl-1-(p-hydroxyphenyl)-6-propoxy-,
2-cyclopentyl-6-cyclopropoxy-1-hydroxyphenyl-,
2-cyclopentyl-1-(o-hydroxyphenyl)-6-propoxy-,
6-butoxy-2-cyclopentyl-1-(p-hydroxyphenyl)-,
6-butoxy-2-cyclopentyl-1-(o-hydroxyphenyl)-3,4-dihydronaphthalenes The 1-(hydroxyphenyl)-3,4-dihydronaphthalenes so obtained are converted to the corresponding 1-(carbalkoxy-alkoxyphenyl)-, and 1-(carboxyalkoxyphenyl)-, and 1-(alkoxyphenyl) derivatives thereof using methods known in the art.

Example 3.—Cyclopentyl-6-methoxy-1-[p-(2,N - pyrrolidinoethoxy) - phenyl]-3,4-dihydronaphthalene and hydrochloride thereof To a solution of 2.0 g. of 2-cyclopentyl-1-(p-hydroxyphenyl)-6-methoxy-3,4-dihydronaphthalene (Example 2) in 14 ml. of dimethylformamide and 70 ml. of benzene there was added 0.27 g. of sodium hydride (56% in mineral oil). Following 30 minutes stirring, 1.61 g. of 1:1 mixture of N-(β-chloroethyl)pyrrolidine and toluene was added, and the mixture brought to reflux. At the end of 17 hours, the mixture was allowed to cool and then mixed with an equal volume of ether and water. The organic fraction was separated and washed one time with water and one time with a saturated solution of sodium chloride. The aqueous fraction was backwashed with ether. Then the organic fractions were combined and taken to dryness to yield 3.80 g. of a gum containing 2-cyclopentyl-6-methoxy-1-[p - (2, - N - pyrrolidinoethoxy)phenyl]-3,4-dihydronaphthalene. The hydrochloride was formed by dissolving the gum in ether and passing anhydrous hydrogen chloride through the ether solution. A solid precipitate came out of the solution upon seeding and it was filtered off to afford 3.85 g. of the crude product. This solid was recrystallized first from ethyl acetate and then from acetone. There was obtained 1.82 g. of solid 2-cyclopentyl - 6 - methoxy-1-[p-(2,N-pyrrolidinoethoxy)phenyl]3,4-dihydronaphthalene hydrochloride, melting point 206.5–208° C. (sintering at 190° C.).

*Analysis.*—Calcd. for $C_{28}H_{36}ClNO_2$ (percent): C, 74.06; H, 7.99; Cl, 7.81. Found (percent): C, 74.11; H, 8.14; Cl. 7.98.

Example 4.—2-cyclopentyl-1-[p-(2,3-dihydroxypropoxy) phenyl]-6-methoxy-3,4-dihydronaphthalene To a solution of 2.76 g. 2-cyclopentyl-1-(p-hydroxyphenyl)-6-methoxy-3,4-dihydronaphthalene (Example 2) in 50 ml. of methanol and 2.04 ml. sodium methoxide there was added 1.01 g. of 1-chloro-2,3-propanediol.

Following 18 hours heating under reflux and 48 hours stirring at room temperature, the mixture was taken to dryness. The residue was dissolved in a mixture of ether and water. The organic layer was separated, washed once with water and once with a saturated solution of sodium chloride. The aqueous layer was backwashed with ether. The organic fractions were combined and taken to dryness yielding 3.09 g. of gummy residue. This residue was chromatograhepd on Florisil. Elution with 20% acetone gave the product as a series of amorphous gums: these were combined to give 1.69 g. of 2-cyclopentyl-[p-(2,3-dihydroxypropoxy)phenyl]-6 - methoxy - 3,4 - dihydronaphthalene as an amorphous solid.

Analysis.—Calcd. for $C_{25}H_{30}O_4$ (percent): C, 7.11; H, 7.7. Found (percent): C, 75.01; H, 8.73.

Using the above procedure but replacing 1-chloro-2,3-propanediol by 1-chloro-2,3-butanediol and 5-bromo-1,3-pentanediol there are obtained 2-cyclopentyl-1-[p-(2,3-dihydroxybutoxy)phenyl]- and 2-cyclopentyl-1-[p-(3,5-dihydroxypentyloxy)phenyl] - 6 - methoxy - 3,4-dihydronaphthalene respectively.

Example 5.—2-cyclopentyl-6-methoxy-1-phenyl-3,4-dihydronaphthalene

Using the procedure described in Example 2, but replacing 2-cyclopentyl - 1 -(p - hydroxyphenyl)-4-(m-methoxyphenyl)-1-butanone by 2-cyclopentyl - 4 - (m-methoxyphenyl)-1-phenyl-1-butanone there is obtained 2-cyclopentyl-6-methoxy-1-phenyl-3,4-dihydronaphthalene.

Similarly, using the procedure described in Example 2, but replacing 2-cyclopentyl-1-(p-hydroxyphenyl)-4-(m-methoxpyhenyl)-1-butanone by the appropriately substituted 4-(alkoxyphenyl cycloalkyl-1-phenyl-1-butanone is productive of the corresponding 3,4-dihydronaphthalenes. Representative of the 3,4-dihydronaphthalenes so prepared are:

1-(p-chlorophenyl-2-cyclopentyl-6-methoxy-,
2-cyclopentyl-6-methoxy-1-(p-methylphenyl)-,
2-cyclopentyl-1-(p-ethylphenyl)-6-methoxy-,
1-(p-chlorophenyl)-2-cyclopentyl-7-methoxy-,
1-(m-chlorophenyl)-2-cyclopentyl-6-methoxy-,
6-methoxy-2-(3-methylcyclopentyl)-1-phenyl-,
2-(3-ethylcyclopentyl)-6-methoxy-1-phenyl-,
1-(p-bromophenyl)-2-cyclopentyl-6-methoxy-,
1-(p-bromophenyl)-2-cyclopentyl-8-methoxy-,
1-(o-chlorophenyl)-2-cyclopentyl-6-methoxy-3,4-dihydronaphthalenes.

I claim:
1. A compound having the formula

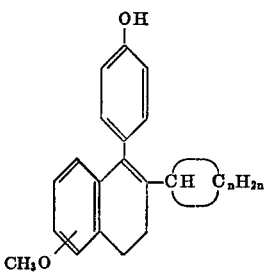

wherein $n$ is 4 or 5.

2. A compound having the formula

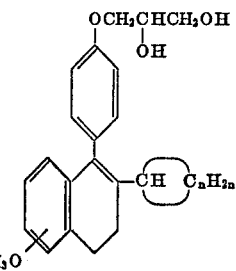

wherein $n$ is 4 or 5.

3. A compound having the formula

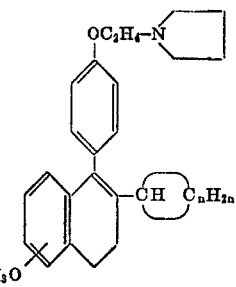

wherein $n$ is 4 or 5.

References Cited
UNITED STATES PATENTS
3,320,271  5/1967  Lednicer _____ 260—307

JOSEPH A. NARCAVAGE, Primary Examiner

U.S. Cl. X.R.
260—613D

UNITED STATES PATENT OFFICE
CERTIFICATE OF CORRECTION

Patent No. 3,804,851                        Dated   April 16, 1974

Inventor(s)  Daniel Lednicer

It is certified that error appears in the above-identified patent and that said Letters Patent are hereby corrected as shown below:

Column 1, line 49 "/₃" should read --/R₃--.  Column 2, line 5, "liwe" should read --like--; lines 6-7 "2,4-dimethylpiperadino" should read --2,4-dimethylpiperzino--; line 7 "piperizino" should read --piperidino--; line 7 "alkylpiperizino" should read --alkylpiperidino--; line 15 "1" should read --I--.  Column 3, line 22 "compound" should read --compounds--; line 23, "R" should read --R₂--.  Column 4, lines 23-27, formulas XIVa and XIVb should read as follows:

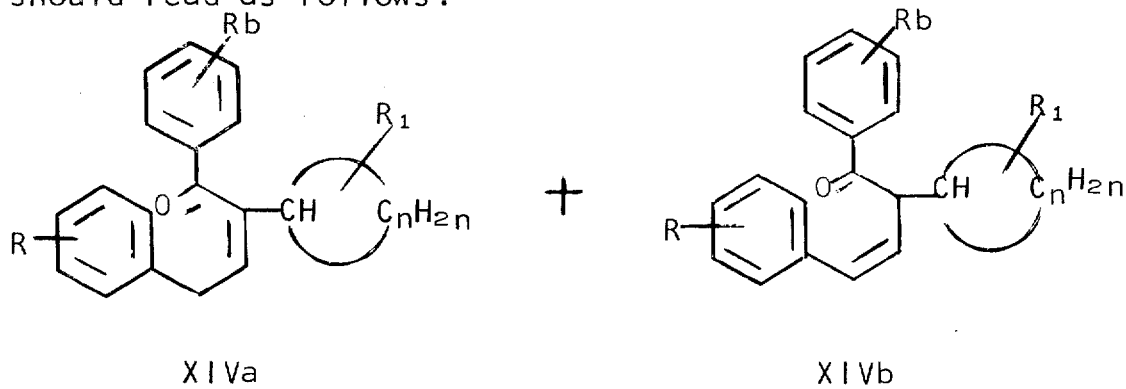

Column 4, line 49 "for readily" should read --for preparing 2-substituted-acetophenones. The reaction is readily--; line 56, "affect the preparing 2-substituted-acetophenones. The reaction is reaction." should read --affect the reaction.--; lines 70-73 "The cis isomers of the compound of Formula II, wherein R₂ is substituted alkoxy group, are prepared in accordance with reaction Page 2

UNITED STATES PATENT OFFICE
CERTIFICATE OF CORRECTION

Patent No. 3,804,851                    Dated   April 16, 1974

Inventor(s) Daniel Lednicer

It is certified that error appears in the above-identified patent and that said Letters Patent are hereby corrected as shown below:

scheme A, B, D, and E set forth in the flow sheet above." should read --The dihydronaphthalenes of formula I wherein $R_2$ is alkoxy or substituted alkoxy is prepared by the method illustrated by reaction scheme A, B, and C in the flow sheet above.--. Column 5, line 38, "acceptable" should read --acceptably--. Column 7, line 18 "sautrated" should read --saturated--; line 36 "pattern" should read --patern--. Column 8, line 18 "(0-hydroxyphenyl)-" should read --(0-hydroxyphenyl- --; line 34 "cyclopentyl" should read -- 2-cyclopentyl --. Column 9, line 14 "C, 7.11" should read -- C, 76.11 --; line 15 "H, 7.7." should read --H, 7.67--; line 35, "alkoxyphenyl cycloalkyl" should read --alkoxyphenyl-2-cycloalkyl--.

Signed and sealed this 17th day of September 1974.

(SEAL)
Attest:

McCOY M. GIBSON JR.                         C. MARSHALL DANN
Attesting Officer                           Commissioner of Patents